5 Sheets—Sheet 1.

E. CORNELY.

EMBROIDERING MACHINE.

No. 10,277. Reissued Jan. 23, 1883.

5 Sheets—Sheet 2.

E. CORNELY.

EMBROIDERING MACHINE.

No. 10,277. Reissued Jan. 23, 1883.

Witnesses:

E. E. Masson

C. J. Hedrick

Inventor:

Emile Cornely by

A. Pollok his attorney

5 Sheets—Sheet 3.

E. CORNELY.

EMBROIDERING MACHINE.

No. 10,277. Reissued Jan. 23, 1883.

Witnesses

E. E. Masson

C. J. Hedrick

Inventor

Emile Cornely by A. Pollok his atty.

E. CORNELY.

EMBROIDERING MACHINE.

No. 10,277. Reissued Jan. 23, 1883.

Witnesses:

E. E. Masson

C. J. Hedrick

Inventor

Emile Cornely by A. Pollok his attorney.

5 Sheets—Sheet 5.
E. CORNELY.
EMBROIDERING MACHINE.
No. 10,277. Reissued Jan. 23, 1883.
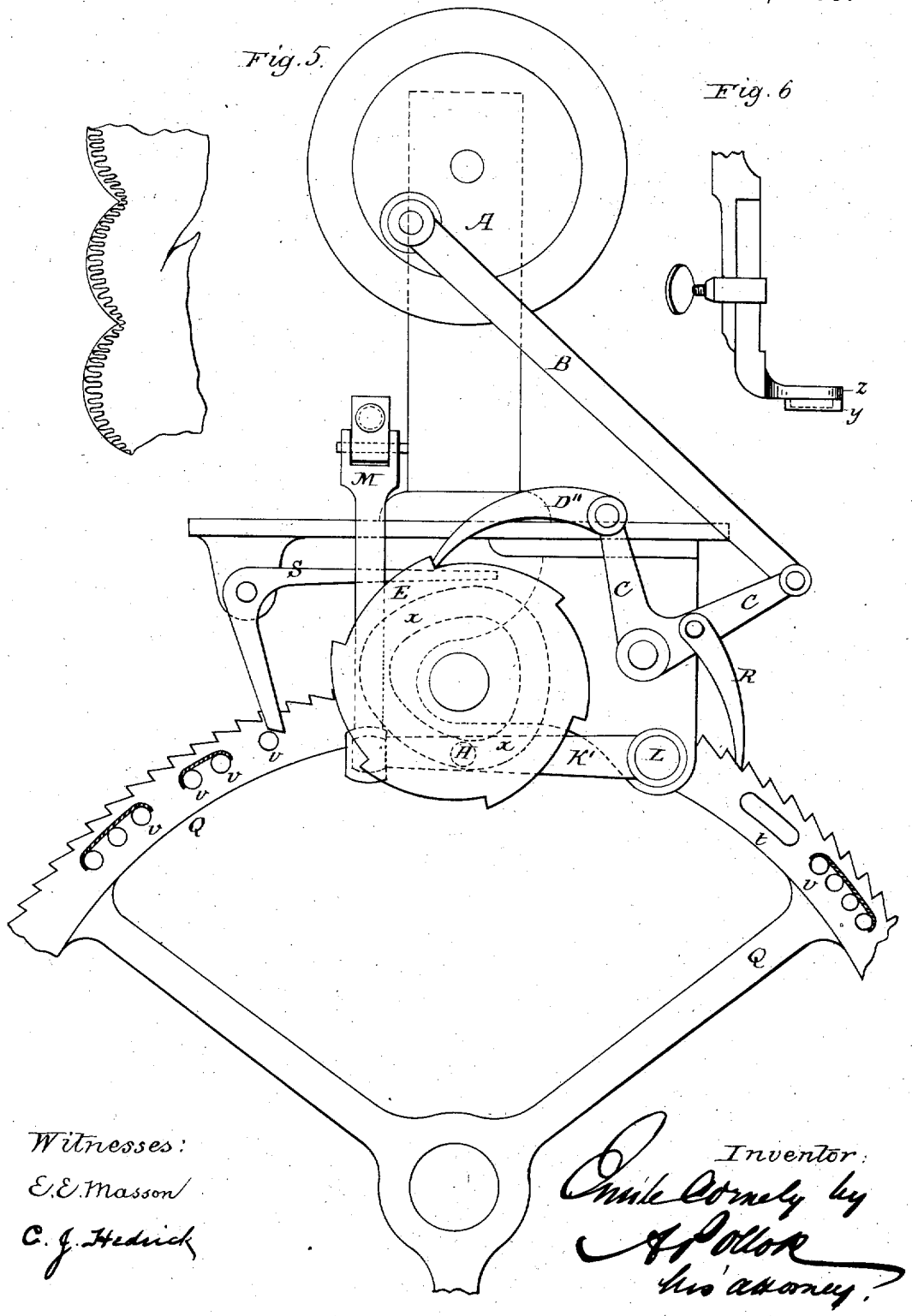
Witnesses:
E. E. Masson
C. J. Hedrick
Inventor:
Emile Cornely by
A. P. Ollor
his attorney.

UNITED STATES PATENT OFFICE.

EMIL CORNELY, OF PARIS, FRANCE.

EMBROIDERING-MACHINE.

SPECIFICATION forming part of Reissue Letters Patent No. 10,277, dated January 23, 1883.

Original No. 148,182, dated March 3, 1874. Application for reissue filed June 21, 1882. Patented in England July 11, 1873, No. 2,395, and in France July 12, 1873, No 99,906.

*To all whom it may concern:*

Be it known that I, EMIL CORNELY, of Washington, in the District of Columbia, United States of America, temporarily residing in Paris, in the Republic of France, have invented certain new and useful Improvements in Overseaming and Embroidering Machines, of which improvements the following specification is a full description, reference being had to the accompanying drawings, which form a part of this specification.

Figure 1:
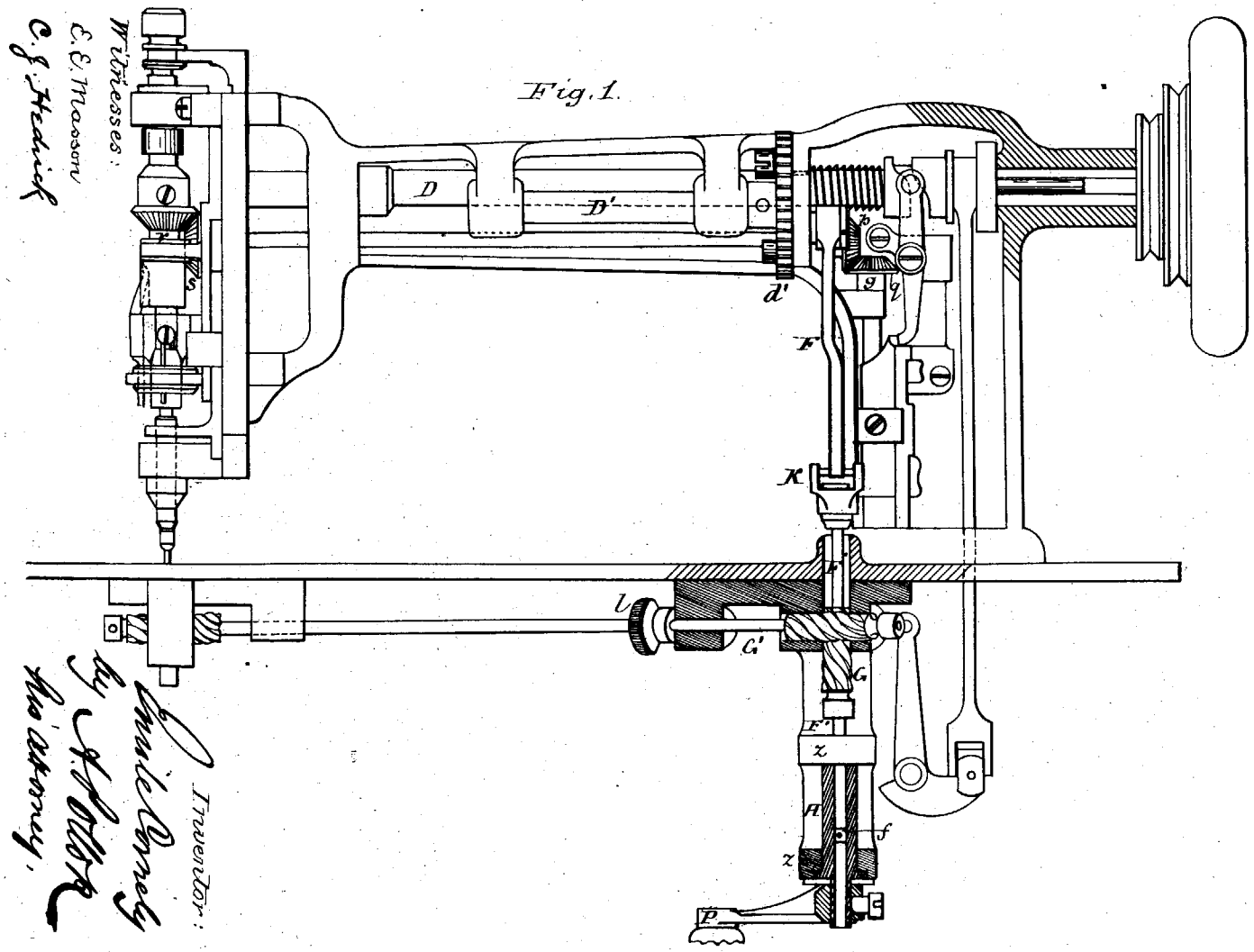
Figure 2:
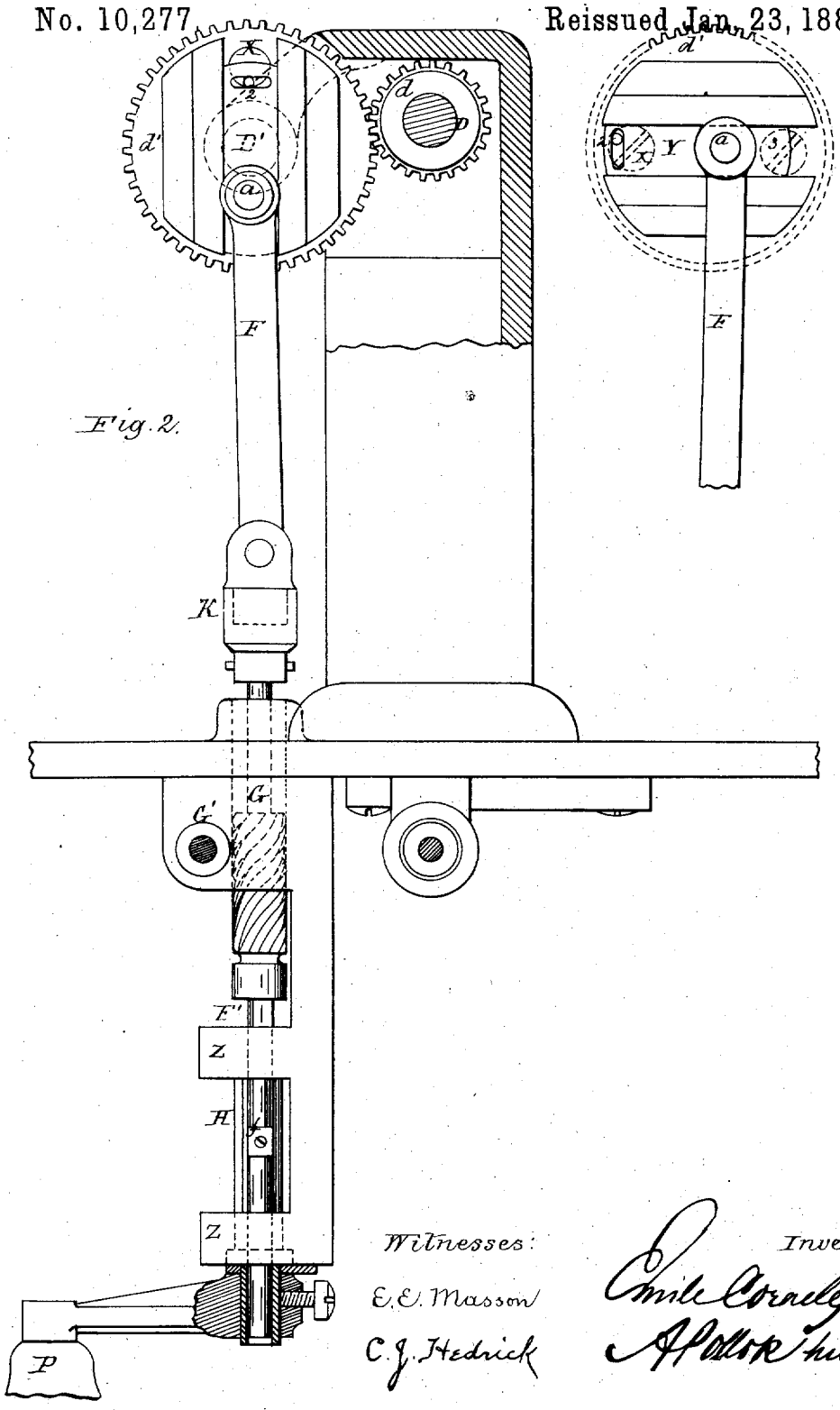

Figure 1 represents an elevation of said machine. Fig. 2 represents an end view. Figs. 3, 4, 5, and 6 represent views to be hereinafter referred to.

My invention relates to certain improvements on the Bonnaz embroidering-machine, for which Letters Patent of the United States Nos. 83,909 and 83,910 were granted to me on the 10th day of November, 1868, as assignee of A. Bonnaz. A description of said machine having been fully given in said Letters Patent, it is needless to repeat it in this specification.

My improvements are designed to make a zigzag chain-stitch or an overseaming-stitch by means of the mechanism of the Bonnaz embroidering-machine, which in its ordinary operation makes an ordinary chain-stitch only, and also to secure to the universally-jointed feed-bar a bearing upon the work more nearly uniform than that obtained by the toothed feed-surface heretofore used, and thus to obtain a more perfect and reliable feed.

The formation of the zig-zag chain-stitch or overseaming-stitch I accomplish by reversing the feed-motion of the machine after each stitch by means of additional mechanism, which is combined with the machine in such manner that its operation in no way interferes with the universal feed-motion of said machine, by which the most intricate embroidery can be produced without turning the material. I am thus enabled to do overseaming work or edging, as well as to make a highly-ornamented embroidering-stitch, which, by the aid of the universal feed-motion, can be employed to execute the most intricate designs without turning the material.

To render the bearing of the feed-bar upon the work more nearly uniform, I employ an elastic and yielding surface, using for the purpose a ring or washer of india-rubber set upon a collar at the bottom of the feed-bar.

To enable others skilled in the art to make and use my invention, I will proceed to describe its construction and operation.

A pinion, *d*, is secured to the main shaft D, Fig. 2, and drives a cogged wheel, *d'*, which is secured to an auxiliary shaft, D'. The pinion *d'*, having double the diameter of the pinion *d*, makes only one revolution to each two revolutions of the latter, and drives, by means of a crank-pin, *a*, a pitman, F, a rod, F', and a screw-gear, G, which latter is in gear with the horizontal screw-gear G', and imparts to it an oscillating motion upon its axis, which is communicated to the feed-motion, as well as to the other principal elements of the machine, by means of the gearings *l m n o p q r s*, Figs. 1, 3, and 4, and as the length of stroke of rod F' is such as to turn the screw-gear G' less than half a turn the feed-motion of the machine is thereby reversed less than half a turn, thereby producing a zigzag chain-stitch, the machine making one stitch to the right, one to the left, one to the right, &c.

As in the Bonnaz embroidering-machine, the feed of the machine is directed by means of a crank-handle, P, but whose operation must not interfere with the vertical reciprocating motion of the rod F and of the screw-gearings G and G'. To obtain this result a stud, *f*, is fixed upon the rod F', and said stud slides within a groove of the sleeve H, which can turn freely in support Z. The crank-handle being secured upon the end of the sleeve H, it can turn the latter while the rod F' slides therein freely; but upon turning the crank P and the sleeve H, the latter will also turn the shaft F', through the stud *f*, as well as the gearings G G' *l m n o p q r s*, and the entire feed apparatus as well as the needle and looper of the machine. The rod F' is connected with the pitman F by means of a universal joint, K, so as to permit the former to play freely on its vertical axis.

It is necessary that the stroke of the rod F' and of its screw-gear G should be made adjustable, so that the oscillation of the screw G' can be regulated very accurately to produce a wider or a narrower zigzag or overseaming stitch. This is effected by securing the crank-pin *a* not directly to the wheel *d'*, but to a slide, Y, which is dovetailed in said wheel. A screw, X, is provided with an eccentric pin, 2, which reaches into a slot of the slide Y, and by turning it said slide can be adjusted so as to bring the crank-pin *a* nearer to or farther off from the center shaft D', thereby reducing or increasing the length of stroke of shaft F', and consequently the width of the overseaming-stitch. The slide Y is secured against the wheel *d'* by the set-screw 3.

The original Bonnaz embroidering-machine is provided with a ring-shaped toothed feed-surface, which, being secured to a feed-bar hinged upon a universal joint, performs the universal feed in any desired direction. The feed-bar being pivoted to a hinge, I find that it does not bear equally well upon the material in any position, which is very essential, chiefly in the overseaming-work and on very light goods, such as muslin or tulle. Instead, therefore, of employing a circular toothed feed-surface, I employ a circular feeder, *z*, Fig. 6, provided with an india-rubber ring or washer, *y*, which is set upon a collar of the feeder *z*, and which, by reason of its elasticity, bears equally well upon the material in any position and produces a more perfect and reliable feed.

Figure 3:
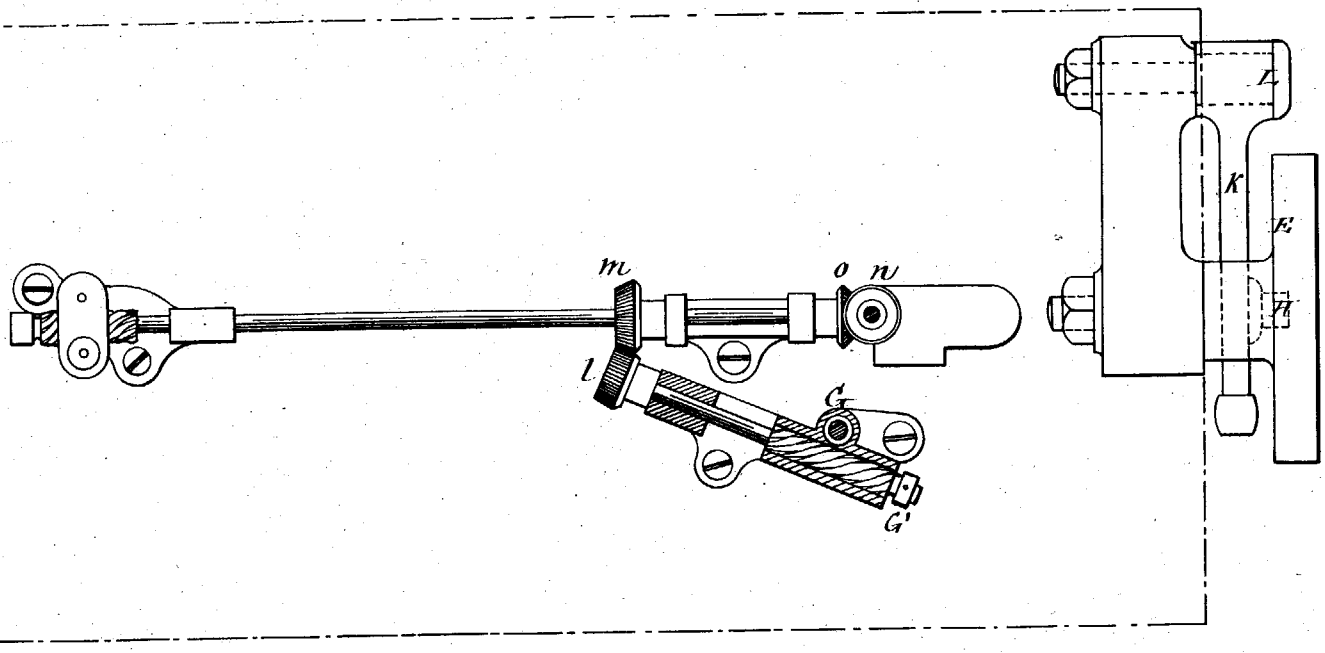
Figure 4:
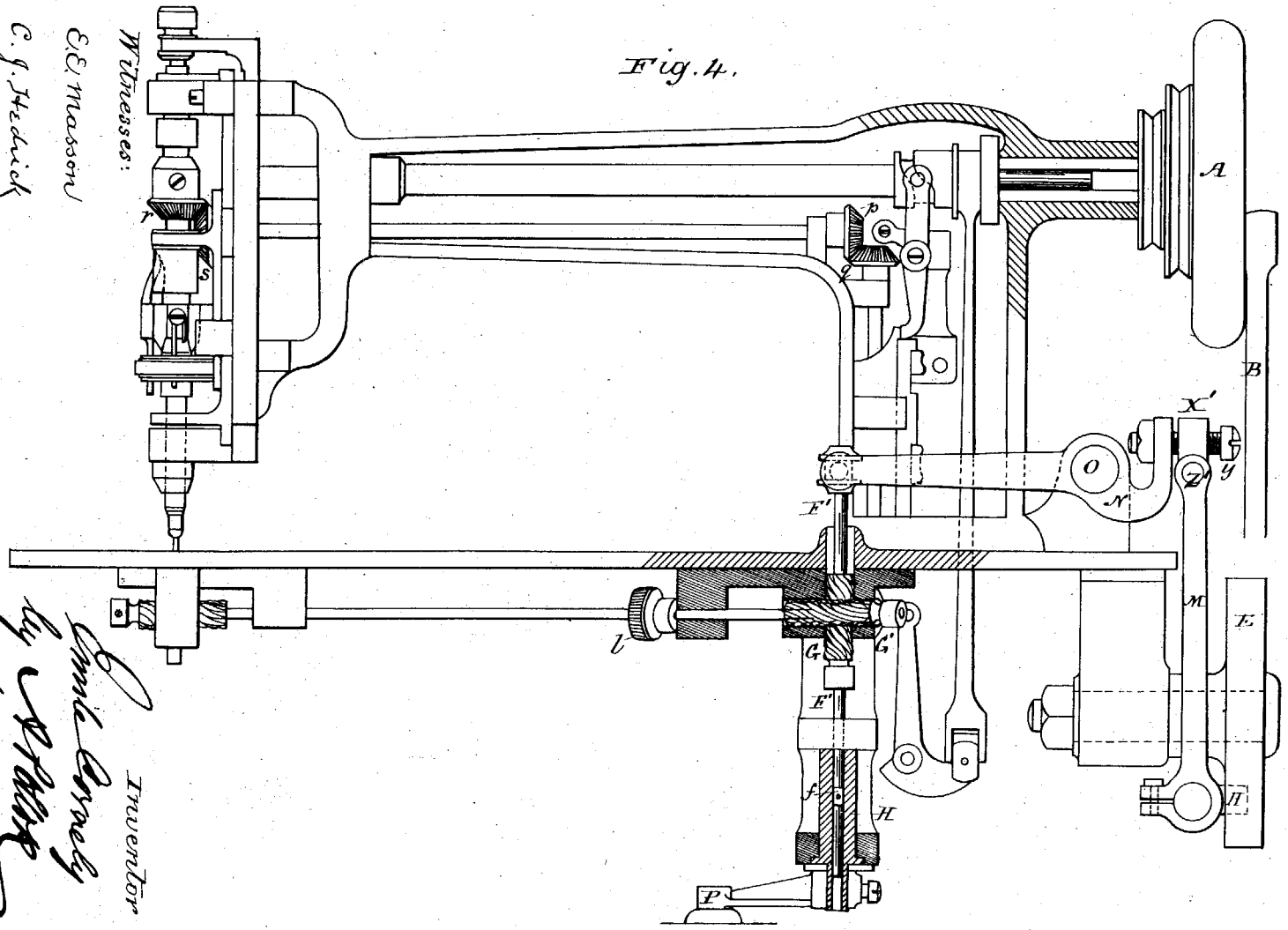

The operation of the rod F', and consequently of the zigzag movement above described, may be stopped during certain intervals, during which the machine produces ordinary chain-stitches, so as to make mixed stitches—for instance, one stitch to the right and an ordinary chain-stitch, one stitch to the left and two ordinary chain-stitches, one stitch to the right and three ordinary chain-stitches, one stitch to the left and four ordinary chain-stitches, &c. The mechanism for producing said mixed stitches is illustrated in Figs. 3, 4, and 5, and operates in the following manner: The fly-wheel A drives the pitman B, lever C, and pawl D'', and the six-toothed ratchet E, which consequently makes one-sixth of a revolution at each stroke of the machine. The friction-roller H, whose axis is secured to the lever K', reaches into the cam-groove *x* of the ratchet-wheel E, and, as the latter is operated upon, it operates the lever K', causing it to swing upon its pivot L. The end of the lever K' is connected with the pitman M, which latter, being attached to the short arm of the lever N, Fig. 4, operates said lever and drives the rod F', the screw-gearings G and G', and the entire zigzag or overseaming apparatus in the manner above described; but the motion of the entire apparatus may be instantly stopped if the pawl D'' is raised at certain intervals, although the motion of the machine may continue. To effect this I employ a large ratchet-wheel, Q, which is driven by means of the pawl R of the lever C. It is provided with pins or studs *v*, and when one of them comes in contact with the vertical arm of the lever S it turns said lever, raising its horizontal arm, and consequently the pawl D, thus stopping instantaneously the motion of the ratchet-wheel E and of the entire zigzag apparatus.

The pins *v* on the wheel Q are arranged in such order as to produce the desired stoppages. If the intervals are to be during several strokes of the machine, several pins may be united by covering them with small metal caps; or studs *t* of the desired length may be employed.

The length of stroke of the rod F may be adjusted by means of the screw *y*, Fig. 4, on which a collar, X', is adjusted, to which the pitman M is pivoted at Z'. Thus the said pivot Z' can be brought nearer to or farther from the fulcrum O of the lever N, producing the desired adjustments in the stroke of rod F.

Having now described my said invention and the manner of carrying the same into effect, what I claim is—

1. In an embroidering-machine, substantially as described, the combination, with the universally-jointed feed-bar, of the rising and falling shaft F', and the system of shafts and gearing connecting said shaft and feed-bar, and imparting to the latter during the operation of the machine a reciprocating or oscillating movement for the production of a zigzag or overseaming stitch, substantially in the manner herein shown and set forth.

2. The combination of the wheels *d d'*, rods F F', screw-gears G G', sleeve H, and crank P, substantially as and in the manner and for the purposes described.

3. The combination, with the wheel *d'*, of the adjustable slide Y, eccentric screw X, set-screw 3, and crank-pin *a*, for the purpose of adjusting the length of the stroke, and consequently the width of the overseaming-stitch, substantially in the manner herein described.

4. The universally-jointed feed-bar provided with the india-rubber ring or washer *y*, secured to the lower end of the feed-bar, substantially as described.

In testimony whereof I have signed this specification in presence of two subscribing witnesses.

EMIL CORNELY.

Witnesses:
E. P. MacLean,
David T. S. Fuller.